(12) United States Patent
Yilmaz et al.

(10) Patent No.: US 11,956,659 B2
(45) Date of Patent: Apr. 9, 2024

(54) NETWORK NODE AND METHOD FOR HANDLING MEASUREMENTS IN A MULTI CONNECTIVITY COMMUNICATION

(71) Applicant: Telefonaktiebolaget LM Ericsson (publ), Stockholm (SE)

(72) Inventors: Osman Nuri Can Yilmaz, Espoo (FI); Mårten Ericson, Luleå (SE); Antonino Orsino, Masala (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 561 days.

(21) Appl. No.: 17/270,232

(22) PCT Filed: Aug. 31, 2018

(86) PCT No.: PCT/SE2018/050880
§ 371 (c)(1),
(2) Date: Feb. 22, 2021

(87) PCT Pub. No.: WO2020/046185
PCT Pub. Date: Mar. 5, 2020

(65) Prior Publication Data
US 2021/0337414 A1    Oct. 28, 2021

(51) Int. Cl.
*H04W 24/10* (2009.01)
*H04W 40/02* (2009.01)
*H04W 76/11* (2018.01)
*H04W 76/15* (2018.01)

(52) U.S. Cl.
CPC .......... *H04W 24/10* (2013.01); *H04W 40/02* (2013.01); *H04W 76/11* (2018.02); *H04W 76/15* (2018.02)

(58) Field of Classification Search
CPC ...... H04W 76/15; H04W 76/11; H04W 40/02
USPC ....................................... 370/329, 400, 405
See application file for complete search history.

(56) References Cited

U.S. PATENT DOCUMENTS

2022/0038554 A1\* 2/2022 Merwaday .............. H04L 67/63

OTHER PUBLICATIONS

International Search Report and Written Opinion dated May 16, 2019 for International Application No. PCT/SE2018/050880 filed on Aug. 31, 2018, consisting of 10-pages.

(Continued)

*Primary Examiner* — Dang T Ton
(74) *Attorney, Agent, or Firm* — Christopher & Weisberg, P.A.

(57) ABSTRACT

A method performed by a network node for handling measurements in a multi connectivity communication between a User Equipment (UE), and multiple nodes is provided. The multiple nodes include a Master Node (MN), and one or more Secondary Nodes (SNs) in a wireless communication network. The network node is any one out of an MN and an SN. The network node sends at least one configuration to the UE. The at least one configuration comprises any one or more out of a path and a destination for sending a report from the UE to at least one out of the MN and the one or more SNs. The report is to include a result of a measurement according to a measurement configuration, configuring the UE to measure a respective frequency provided by at least one out of the MN and the one or more SNs for communication.

18 Claims, 15 Drawing Sheets

(56) References Cited

OTHER PUBLICATIONS

ETSI TS 136 300 V15.2.0; LTE; Evolved Universal Terrestrial Radio Access (E-UTRA) and Evolved Universal Terrestrial Radio Access Network (E-UTRAN); Overall description; Stage 2 (3GPP TS 36.300 version 15.2.0 Release 15), consisting of 375-pages.
ETSI TS 138 331 V15.2.1; 5G; NR; Radio Resource Control (RRC); Protocol specification (3GPP TS 368.331 version 15.2.1 Release 15), consisting of 299-pages.
3GPP TSG-RAN WG2 NR Ad hoc#2 R2-1706936; Title: SN Measurement report transmission path selection in EN-DC; Agenda Item: 10.2.4; Source: Samsung; Document for: Discussion and Decision: Date and Location: Jun. 27-29, 2017, Qingdao, China, consisting of 3-pages.
3GPP TSG-RAN WG2 Meeting #98 R2-1705790; Title: Measurement report in LTE-NR DC; Agenda Item: 10.2.2.1; Source: CMCC; Document for: Discussion: Date and Location: May 15-19, 2017, Hangzhou, China, consisting of 2-pages.
3GPP TSG-RAN WG2 Meeting #AH1807 R2-1809637; Title: Measurement and gap configuration framework in NE-DC; Agenda Item: 10.2.6; Source: ZTE Corporation; Document for: Discussion and Decision: Date and Location: Jul. 2-6, 2018, Montreal, Canada, consisting of 5-pages.
EPO Communication and Search Report dated Aug. 19, 2021 for Patent Application No. 18931568.2, consisting of 4-pages.
EPO Communication and Written Opinion dated Aug. 31, 2021 for Patent Application No. 18931568.2, consisting of 3-pages.
3GPP TSG-RAN WG4 Meeting #84 R4-1707002; Title: RAN4-NR#2 Meeting Report; Agenda Item: 4; Document for: Approval; Date and Location: Aug. 21-25, 2017, Berlin, Germany, consisting of 227-pages.
EPO Communication dated May 17, 2023 for Patent Application No. 18931568.2, consisting of 11-pages.
3GPP TSG-RAN WG2 Meeting #98 R2-1705133; Title: Measurement configuration coordination between MN and SN; Agenda Item: 10.2.3; Source: Huawei, HiSilicon; Document for: Discussion and Decision; Date and Location: May 15-19, 2017, Hangzhou, China, consisting of 4-pages.

* cited by examiner

501. Obtain a respective configuration from each of the MN and one or more SNs, each configuration comprising any one or more out of: the path and the destination for sending a respective report from the UE to each one of the MN and the one or more SNs.

502. Send to the UE, at least one configuration comprising any one or more out of: a path and a destination for sending a report with a result of a measurement according to a measurement configuration, from the UE to at least one out of: the MN and the one or more SNs.

Fig. 5

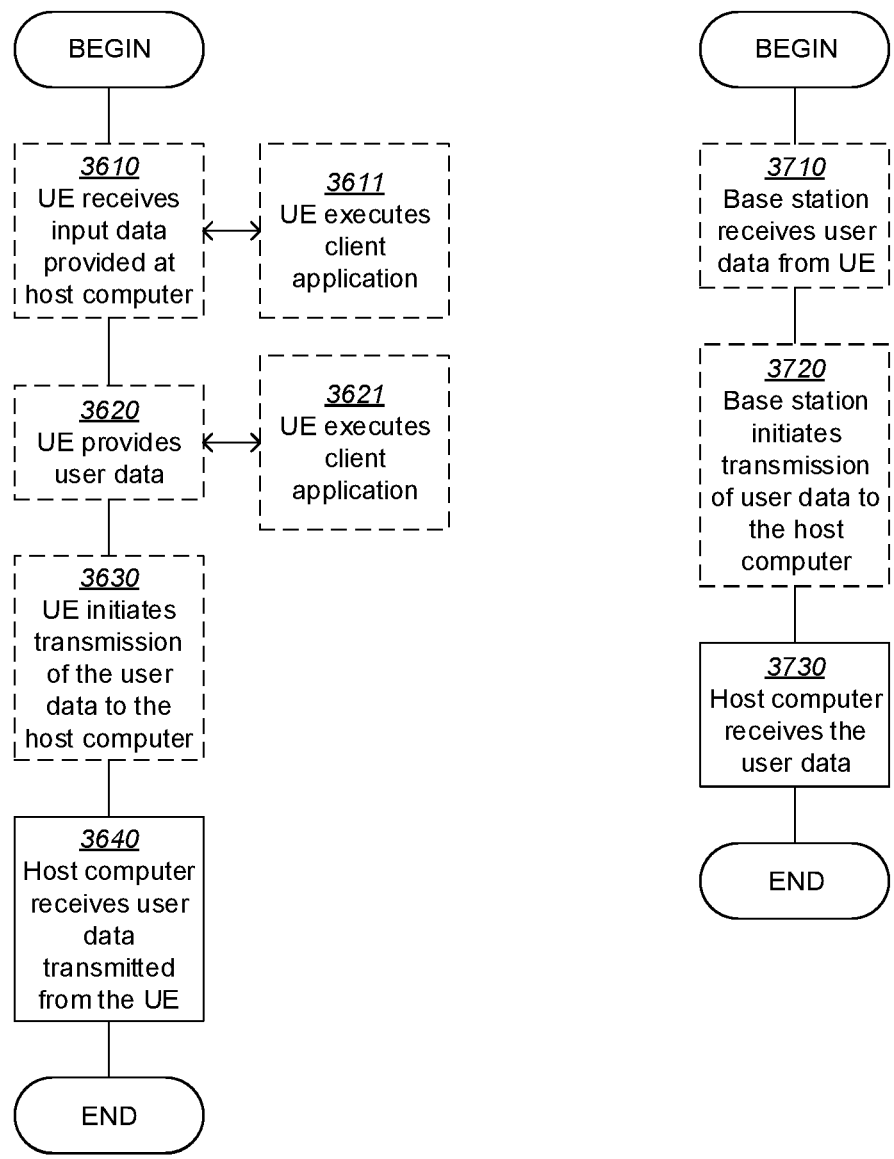

NETWORK NODE AND METHOD FOR HANDLING MEASUREMENTS IN A MULTI CONNECTIVITY COMMUNICATION

CROSS-REFERENCE TO RELATED APPLICATIONS

This application is a Submission Under 35 U.S.C. § 371 for U.S. National Stage Patent Application of International Application Number: PCT/SE2018/050880, filed Aug. 31, 2018 entitled "NETWORK NODE AND METHOD FOR HANDLING MEASUREMENTS IN A MULTI CONNECTIVITY COMMUNICATION," the entirety of which is incorporated herein by reference.

TECHNICAL FIELD

Embodiments herein relate to a network node and a method therein. In some aspects, they relate to handling measurements in a multi connectivity communication between a User Equipment (UE) and multiple nodes in a wireless communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

In 3GPP Dual-Connectivity (DC) has been specified, both for LTE and between LTE and NR. In DC two nodes involved, a Master Node (MN) or (MeNB) and a Secondary Node (SN) or (SeNB). Multi-Connectivity (MC) is the case when there are more than two nodes involved.

3GPP Dual Connectivity

As mentioned above, DC is standardized for both LTE and E-UTRAN-NR DC (EN-DC).

LTE DC and EN-DC are design differently when it comes to which nodes that control what. Basically, there are two options, a centralized solution like LTE-DC, and a decentralized solution, like EN-DC.

FIG. 1 shows a schematic control plane architecture looks like for LTE DC in a scenario with a UE, a Master Node (MN) and a Secondary Node (SN). FIG. 2 shows a schematic control plane architecture looks like for EN-DC in a scenario with a UE, an MN and an SN. The main difference here is that in EN-DC, the SN has a separate Radio Resource Control (RRC) entity referred to as NR RRC. This means that the SN can control the UE also; sometimes without the knowledge of the MN but often the SN need to coordinate with the MN. In LTE-DC, the RRC decisions are always coming from the MN, from the MN to the UE. Note however, the SN still decides the configuration of the SN, since it is only the SN itself that has knowledge of what kind of resources, capabilities etc. the SN have.

Below two different DC specifications and their RRC messages will be described in more detail.

LTE DC

FIG. 3 illustrates an overview of the LTE-DC configurations. When an MeNB, referred to as MN in FIG. 3, decides to request 301 an SeNB addition, the MeNB indicates 302 within Second Cell Group (SCG)-Configuration Information (ConfigInfo) See 3GPP TS 36.300 V15.2.0 (2018-06), the Master Cell Group (MCG) configuration and the entire UE capabilities for UE capability coordination as well as the latest measurement results for the SCG cell(s) requested to be added, see FIG. 3. The SN responds 303 an acknowledgement with a SCG-Config and the latest measConfig to the MeNB. If the MeNB accepts the SCG-Config configurations, it sends 304 this to the UE as well as the UE measurement configurations (MeasConfig) in the RRCConnectionReconfiguration message to the UE.

The MeNB cannot change the SCG Configuration from the SeNB, just accept or reject. The reason for this is that the MeNB is not fully aware of the available resources and capabilities of the SeNB. Thus, if the MeNB modifies the SCG-Configuration it can lead to a case that the UE will utilize incorrect resources. In practice, the measurement configuration is controlled by the MeNB. Note also that in LTE-DC centralized solution the UE's measurement report is sent 305 to the MeNB only.

EN-DC2

The second option is to use a decentralized option, which is used by EN-DC. This means that the SN can directly configure the UE with measurement.

In EN-DC, the main reason to have decentralized measurement configurations was latency requirements. Thus, by supporting a special Signaling Radio Bearer, (SRB), referred to as SRB3, for the SN node of NR, which allows the SN to configure the measurement separately without involving the MN, the SN can speed up the measurements and measurement configurations. The intention here is that the SRB3 using NR radio may allow faster transmission than the corresponding LTE SRBs. Also, the backhaul link, the so called X2 interface which may be exchanged with Xn in standalone NR use cases, which is used for communication between the MN and SN may be congested which may negatively affect both the measurement reporting and new measurement configurations.

Thus, sending the UE measurement report directly to the concerned node, MN or SN, can speed up a necessary action such as e.g. switch a node and/or add a node. Another reason to have decentralized measurements is that LTE and NR use slightly different RRC and different mobility, which also makes it convenient to split the responsibility.

The decentralized EN-DC solution option includes measurement capability coordination. According to latest 3GPP agreement the SN shall inform the MN every time it changes which carrier frequencies the UE shall measure on. The measurement capability coordination is necessary to not exceed the number of carriers the UE can measure, and also for the gap coordination, this will be explained below. If MN and SN configure more carriers than the UE can measure on, the UE probably will randomly ignore one or more carriers for measurements. In the worst case, these ignored carriers may be the most important carriers to measure on.

If the SN receives from the MN a new value for the maximum number of frequency layers or reporting configurations, and it has already configured all the allowed measurements or reporting configurations based on the previous maximum values, it releases the required number of measurements or reporting configurations to comply with the new limit.

Thus, it is important to coordinate the measured frequency carriers which is used to coordinate the measurement gaps. To understand why it is important to also coordinate the measurement gaps between MN and SN, it will be explained in more detail below how the measurements in EN-DC work.

Regarding the EN-DC measurement configurations it should be noted that an important difference compared to LTE-DC is that since the SN also can configure the UE's measurements, these are also transmitted to the SN via the SRB3, if configured.

Measurement Gaps in EN-DC

EN-DC may use both "LTE frequencies" and very high 5G frequencies. 3GPP distinguishes between FR1 frequency and FR2 frequency. FR1 frequency is below 6 GHz and FR2 is above 28 GHz. The reason this is done like this is because of different UE capabilities. Some more advanced UEs can receive data on FR1 and measure on FR2 simultaneously and vice versa, while some cannot measure on FR1 and receive data on FR2 at the same time and vice versa.

To be able to measure on any of the frequencies FR1 and FR2, the UE must be configured with a so called gap, i.e. a certain time period when the UE does not receive any data on this frequency and can focus on measuring on other cells in this frequency range. If the UE can receive data on FR1 and measure on FR2 simultaneously and vice versa, the gap is called "per-FR gap". If a UE cannot measure on FR1 and receive data on FR2 simultaneously and vice versa, it is called "per-UE gap". The most efficient way is always to configure per-FR gap, because per-UE gap will influence the scheduling of all serving cells and consequently both FR1 and FR2 data will be interrupted then, i.e. all data transmission will be impacted for a short period for per-UE gap measurements.

RAN2 has agreed that the network can choose either per-UE gap or per-FR gap for a UE. As said earlier, both MN and SN can configure the UE with measurement gaps. Thus, some gap coordination is needed. This gap coordination is a bit tricky.

In general, the MN configures the gap to the UE if the UE is per-UE capable. Thus, the MN needs to know the SN frequencies in order to calculate a suitable gap also for the SN, and then send this gap configuration to the SN. The SN can send the FR1 and/or FR2 frequencies to the MN via Cell Group-Configuration.

If the UE is capable of per FR1 and/or FR2 gaps, it is decided that the MN configures the FR1 gaps and the SN configures the FR2 gaps. However, for the per FR1/FR2 gap case, the MN and SN need to coordinate the gaps, so they don't overlap.

For either per-UE gap or per-LTE/FR1 gap, the MN transmits the gap pattern to the SN via CG-ConfigInfo. CG-ConfigInfo is the NR name of the SCG-Config in LTE.

Multi-Connectivity

The idea with Multi-Connectivity (MC) is that the UE can connect to more than two nodes, i.e. more than one SN node. The benefits with MC are similar to DC, but MC allows even more new areas to be utilized, e.g. centralized scheduler, even more robust mobility etc.

For an MC solution with only one type of radio network nodes, e.g. NR base stations, some of the above arguments to have a decentralized solution are not as strong anymore since all NR nodes should be equally capable.

From a migration point of view, it is natural to continue using EN-DC principles also for MC, i.e. using a decentralized solution. Also, there may still be cases when a decentralized measurement solution is beneficial, e.g. when the network nodes have different capabilities e.g. 700 MHz nodes vs. 28 GHz nodes.

SUMMARY

As part of developing embodiments herein, a problem was identified by the inventors, and will first be discussed.

In case of NR-NR Dual Connectivity (NN-DC), both nodes can generate the measurement configuration, so-called decentralized measurement configuration for e.g. at least the SN frequency. This configuration may be conveyed to the UE via NR RRC Information Elements (IEs). In this case, content-wise the RRC reconfiguration message and specifically the measurement configuration would look the same regardless of who generated the IEs since both nodes are NR. Since these IEs can be mapped to an RRC message carried over MN SRB regardless of which node generated the IE, i.e., the MN or SN, from the UE point of view, it is not visible who configured the measurement configuration. The wording mapped when used herein means that the IE is included in the RRC message. In this case, it is not clear for the UE over which SRB the measurement report should be sent. If the measurement report is sent to the wrong node, it may not be clear for the recipient node why it received the report. Also, if the received measurement report has a measurement Identity (ID) that was previously configured by the recipient node, there may be a misalignment in the configured and received measurement reports with a consequent wrong network behavior. It has been noted that the problem is even more severe when the scenario is an NR multi-connectivity scenario, i.e., one MN and more than one SN.

However, decentralized measurement configuration is complex to coordinate, especially when the UEs measurement capabilities shall be utilized to the fully and also coordinate the measurement gaps. Then, the centralized approach where MN configures all the measurements may be preferable, yet this approach also has some disadvantages such as the case that all measurement reports are received by the MN. This may slow down necessary mobility actions such as to switch and/or add node, new cells to measure on etc.

An object of embodiments herein is to improve the performance in a wireless communications network using DC or MC.

According to an aspect of embodiments herein, the object is achieved by a method performed by a network node for handling measurements in a multi connectivity communication between a User Equipment, UE, and multiple nodes. The multiple nodes comprise a Master Node, MN, and one or more Secondary Nodes, SNs, in a wireless communication network. The network node is any one out of an MN 110 and an SN.

The network node sends 502 at least one configuration to the UE. The at least one configuration comprises any one or more out of a path and a destination for sending a report from the UE to at least one out of the MN and the one or more SNs. The report is to comprise a result of a measurement according to a measurement configuration, configuring the UE to measure a respective frequency provided by at least one out of the MN and the one or more SNs for communication.

According to another aspect of embodiments herein, the object is achieved by a network node for handling measurements in a multi connectivity communication between a User Equipment, UE, and multiple nodes. The multiple nodes are adapted to comprise a Master Node, MN, and one or more Secondary Nodes, SNs, in a wireless communication network. The network node is adapted to be any one out of a MN and an SN. The network node is configured to send at least one configuration to the UE. The at least one configuration is adapted to comprise any one or more out of: a path and a destination. The path and the destination are for sending a report from the UE 120 to at least one out of the MN and the one or more SNs. The report is adapted to comprise a result of a measurement according to a measurement configuration. The measurement configuration configures the UE to measure a respective frequency provided by at least one out of: the MN and the one or more SNs for communication.

By including in a configuration, the path and the destination over which the UE should send the measurements reports to the respective MN and SN, any ambiguity in the measurement reporting is avoided. This results in an improved performance in the wireless communications network using DC or MC.

A further advantage of embodiments herein is that this enables a very flexible way to configure the UE. For example, it enables a centralized configuration so that the need for coordination of the measurements are minimized. Also, this enables a complete decentralized solution which can for example be useful when the X2/Xn link between the MN and SNs is congested or if there is a need for the SN to act very fast based on UE measurements.

BRIEF DESCRIPTION OF THE FIGURES

FIG. 5 is a flowchart depicting embodiments of a method in a network node.
FIGS. 14-17 are flowcharts illustrating methods implemented in a communication system including a host computer, a base station and a user equipment.

DETAILED DESCRIPTION

According to some embodiments herein a measurement configuration of a UE may be generated by either an MN or any of the SNs in a multi connectivity communication. The measurement configuration comprises a path and/or destination information for reporting the measurement results of the respective MN and SNs according to the respective measurement configuration. The destination and/or path information may be an SRB identity or similar identifier for the path and/or destination. The SRB identity information may be included in a measurement configuration information element or a measurement object in the NR RRC specification and in the corresponding Abstract Syntax Notation (ASN.1) of the NR RRC specification.

The SN measurement in the UE for the multi connectivity communication may be configured a) by the MN which may be referred to as centralized, or b) by any of the SNs which may be referred to as decentralized. In either case the measurement configuration may be sent via a final MN RRC message.

Figure 1:
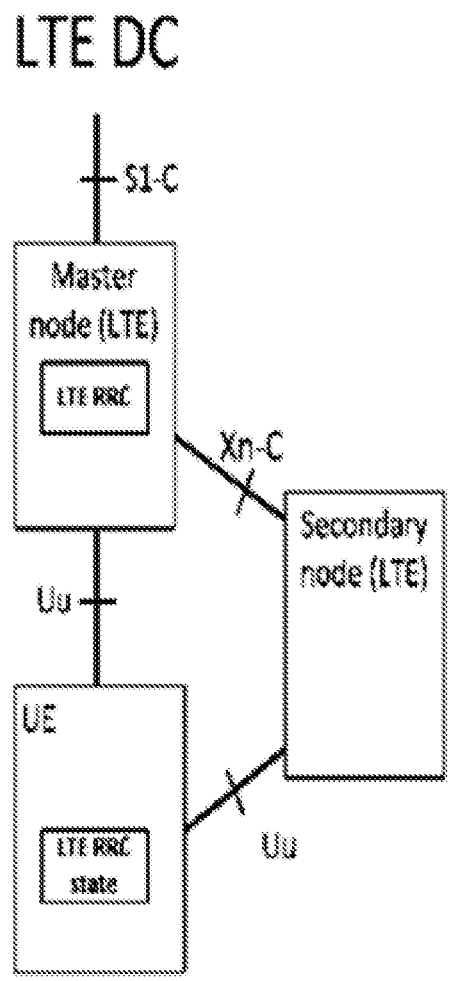
FIG. 1 is a schematic block diagram illustrating prior art.
Figure 2:
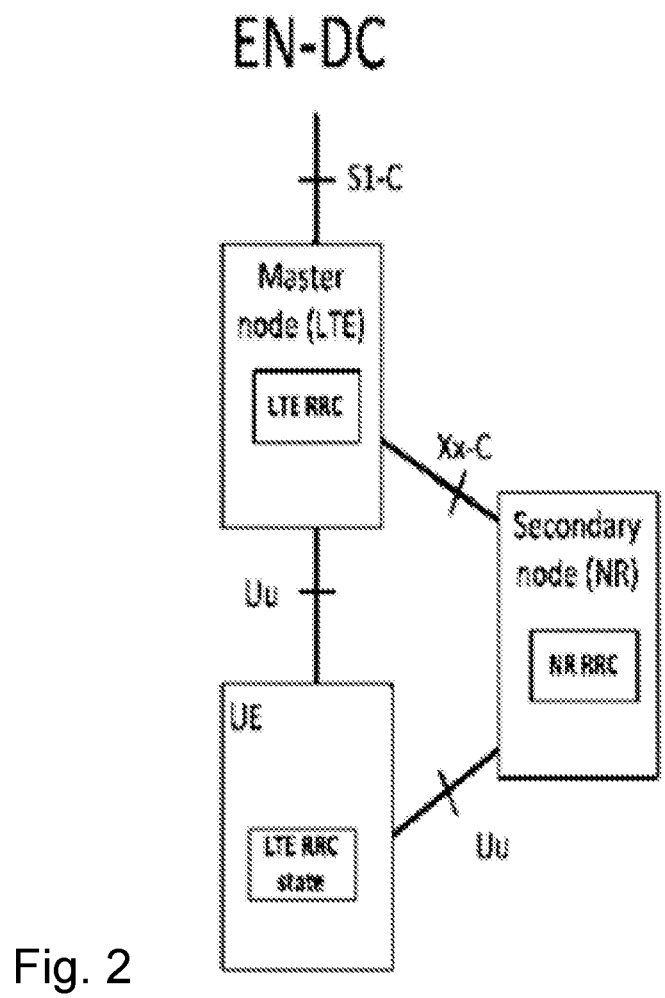
FIG. 2 is a schematic block diagram illustrating prior art.
Figure 3:
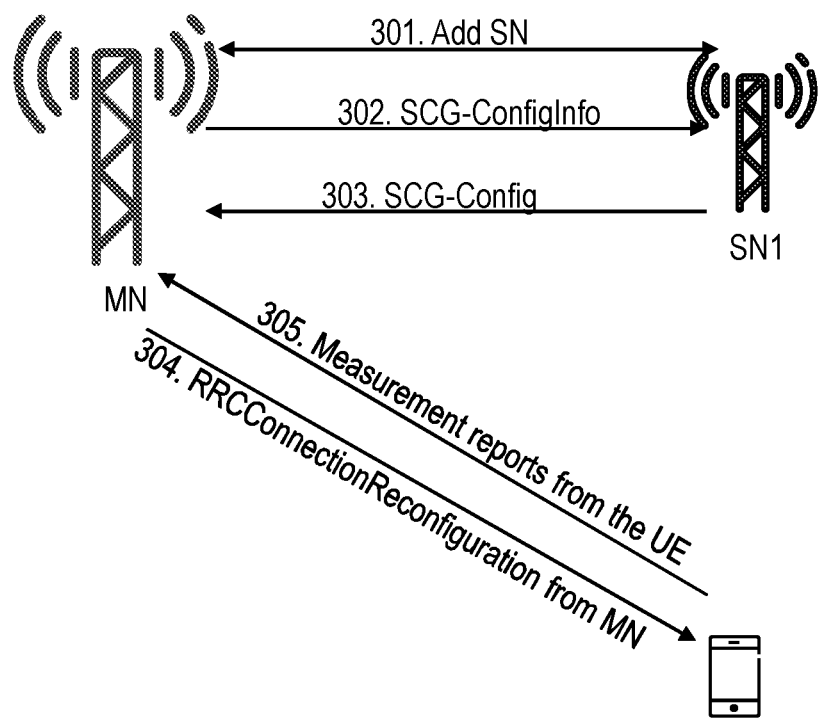
FIG. 3 is a schematic block diagram illustrating prior art.
Figure 4:
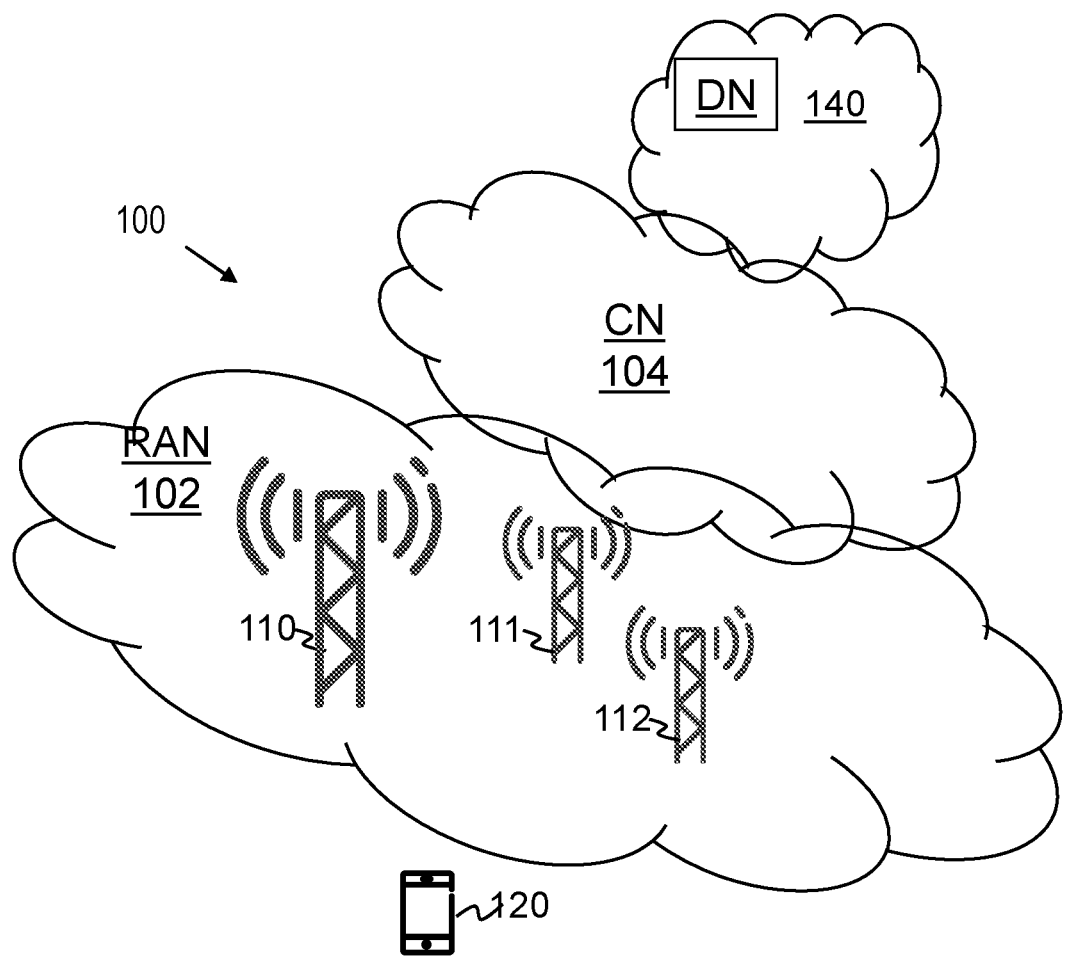
FIG. 4 is a schematic block diagram illustrating embodiments of a wireless communications network.

Embodiments herein relate to wireless communication networks in general. FIG. 4 is a schematic overview depicting a wireless communications network 100. The radio communications network 100 comprises one or more RANs 102 and one or more CNs 104. The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Nodes operate in the radio communications network 100, such as a network node 110, a network node 111, and a network node 112. The respective network nodes 110, 111, 112 provides radio coverage over a geographical area, which may also be referred to as a cell, a beam or a beam group of the same or different a Radio Access Technology (RAT), such as 5G, LTE, Wi-Fi, NB-IoT, CAT-M, Wi-Fi, eMTC or similar. The respective network node 110, 111, 112 may e.g. be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a UE within the radio coverage area served by the respective network node 110, 111, 112 depending e.g. on the radio access technology and terminology used. The respective network node 110, 111, 112 may communicate with a UE with Downlink (DL) transmissions to the UE and Uplink (UL) transmissions from the UE.

In the wireless communication network 100, UEs e.g. a UE 120 operate. The UE may e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "UE" is a non-limiting term which means any terminal, wireless communication terminal, wireless device, Device to Device (D2D) terminal, or node e.g. smart phone, laptop, mobile phone, sensor, relay, mobile tablets or even a small base station communicating within a cell.

Methods according to embodiments herein may be performed by any of the network nodes 110, 111, and 112. In an example scenario wherein the UE 120 is using a multi-connectivity in a communication, the network node 110 is a master node and may be referred to as the MN 110. Further, the network nodes 111, and 112 are secondary nodes and may be referred to as the SN 111 and the SN 112, or the SN 111, 112.

Methods for handling measurements in a multi connectivity communication between the UE 120 multiple nodes in a wireless communications network 100, are performed by any of the network nodes 110, 111, and 112. As an alternative, a Distributed Node DN and functionality, e.g. comprised in a cloud 140 as shown in FIG. 4 may be used for performing or partly performing the methods.

To resolve the ambiguity in measurement reporting in case of NN-DC or multi-connectivity, the UE 120 is configured over which path and/or to which destination the UE should send a respective measurement report for each measurement performed on the respective MN and SNs such as e.g. each object and each measurement event. In this case, an Information Element (IE) configuring the measurement and measurement report network destination may be generated by either MN 110 or SN 111, 112.

According to the ASN.1 terminology in NR RRC specification, see 3GPP TS 38.331 or LTE RRC specification, see 3GPP TS 36.331, in ASN.1, every field encapsulates the corresponding information element. In case of a measurement object:

A measurement object field (measObjec) in an IE is used for indicating a UE such as the UE 120 regarding measurement e.g., what frequency to measure according to the MeasObject IE description.

A measurement object IE (MeasObject) describes what information can be included in measurement object.

There is also measurement event configuration which is coupled with the measObject fields so as to let the UE know when to send these measurements carried out as measurement report to the network. All these configurations are sent under an ASN.1 hierarchy of measurement configuration i.e., measConfig field includes measObject field and other fields; and each field gets the corresponding IE filled with the respective configuration information according to the IE description.

To speed up mobility actions in some embodiments, e.g., any of handover, SN addition, change and modification, in case of NN-DC or multi-connectivity, the UE 120 is configured over which path and/or destination such as SRB it should send a measurement report for each measurement object and possibly each measurement event. In this case, an IE configuring the measurement and measurement report destination is generated by the MN 110.

Decentralized Configuration

By including in the measurement configuration e.g. over which SRB the UE 120 should send the measurements report, any ambiguity in the measurement reporting in case of NN-DC is avoided. Also, an erroneous network behavior is avoided in case the received measurement report was intended for another network node.

Centralized Configuration

By decoupling the SN configuration and measurement configuration from the measurement reporting according to some embodiments herein, there is minimal need to coordinate the measurement frequencies and measurement gaps. Further on, since the SNs 111, 112 receives its own measurement reports, it is possible for the respective SN 111, 112 to act quickly on these measurements if needed. Also, since the MN 110 may also receive all the measurement reports it is possible for the MN 110 to make a more centralized scheduler assuming a relatively fast BH for the X2/Xn interface is available.

Example embodiments of a flowchart depicting embodiments of a method performed by the network node 110, 111, 112 for handling measurements in a multi connectivity communication between the UE 120, and multiple nodes are depicted in FIG. 5 and will be described more in detail in the following. The multiple nodes comprise the MN 110 and one or more SNs 111, 112 in the wireless communication network 100. As mentioned above the MN 110 and the one or more SNs 111, 112 may use the same or different radio access technology. The network node 110, 111, 112 is any one out of: an MN 110 and an SN 111, 112.

It should be noted that the wording multi connectivity communication when used herein means that the UE 120 is connected to one MN and one or more SNs. This means that the wording multi connectivity comprises also dual connectivity.

The method may comprise one or more of the following actions which actions may be taken in any suitable order.

According to an example scenario the UE 120 is about to use multi connectivity communication with multiple nodes in the wireless communications network 100, and need to be configured.

Action 501.

In some embodiments, the network node 110, 111, 112 may obtain a respective configuration from each of the MN 110 and one or more SNs 111, 112. Each configuration comprises any one or more out of a path and the destination for sending a respective report from the UE 120 to each one of the MN 110 and the one or more SNs 111, 112.

The respective report may in these embodiments comprise a result of a respective measurement according to the measurement configuration. The measurement configuration configures the UE 120 to measure a respective frequency provided by each respective MN 110 and one or more SNs 111, 112 for communication.

This means that the network node 110, 111, 112, collects the configurations from all the nodes 110, 111, 112 in the communication. This is to send all configurations from the nodes in the communication together in a message to the UE 120. The network node 110, 111, 112 may obtains its own configuration and further collect configurations from the other nodes 110, 111, 112 in the communication. In one example the network node 110, 111, 112 is the MN 110 which obtains its own configuration and collects configurations from the SNs 111, 112 in the communication.

Action 502.

The network node 110, 111, 112 sends at least one configuration to the UE 120. The at least one configuration comprises any one or more out of a path and a destination. The path and/or the destination are for sending a report from the UE 120 to at least one out of the MN 110 and the one or more SNs 111, 112. The report is to comprise a result of a measurement according to a measurement configuration. The measurement configuration configures the UE 120 to measure a respective frequency provided by at least one out of: the MN 110 and the one or more SNs 111, 112 for communication. The frequency may comprise any one out of a carrier frequency, a frequency band and a part of a frequency band. The at least one configuration may be sent to the UE 120 in an RRC message.

As mentioned above, in some embodiments the network node 110, 111, 112 has obtained in Action 501 a respective configuration from each of the MN 110 and one or more SNs 111, 112. In these embodiments, the network node 110, 111, 112 sends the at least one configuration to the UE 120 by sending to the UE 120 the respective obtained configuration for each one out of the MN 110 and the one or more SNs 111, 112.

A path when used herein e.g. refers to information about which radio interface(s) the UE 120 shall use for sending each respective measurement report. Thus the respective path may e.g. comprise any one or more out of an identifier for an SRB, an identifier for an MCG path of the SRB, if it is a Split SRB, and an identifier for SCG path of the SRB, if it is a Split SRB. Thus, the path may e.g. be an identifier of an SRB such as e.g., SRB1, SRB2 or SRB3 and/or an MCG/SCG path of the SRB if it is a Split SRB.

A destination when used herein refers to information about where the UE 120 shall send each measurement report.

The respective destination may e.g. comprise any one or more out of: An identifier for an RRC entity, an identifier for a network node such as e.g. any of the MN 110 and the SNs 111, 112, and an identifier for a central or distributed unit.

The at least one configuration may further comprise any one or more out of: The measurement configuration, and a measurement event configuration. The measurement event configuration is for configuring the UE 120 when to send the respective report comprising the result of the measurement, to the at least one out of: the MN 110 and the one or more SNs 111, 112.

In some embodiments, the network node 110, 111, 112 is the MN 110. In these embodiments, the sending of at least one configuration to the UE 120 comprises: Sending to the UE 120 the respective configuration for each one out of the MN 110 and the one or more SNs 111, 112. In other words, in these embodiments, the at least one configuration comprises more than one configurations, i.e. a respective configuration for each one out of the MN 110 and the one or more SNs 111, 112.

In these embodiments each respective configuration comprises any one or more out of the path and the destination for sending a respective report from the UE 120 to each one of the MN 110 and the one or more SNs 111, 112. In other words, compared to the more general embodiments wherein the report is sent to at least one out of the MN 110 and the one or more SNs 111, 112, a respective report are in these centralized embodiments sent to from the UE 120 to each one of the MN 110 and the one or more SNs 111, 112. The respective report is to comprise a result of a respective measurement according to the measurement configuration. The measurement configuration configures the UE 120 to measure a respective frequency provided by each respective MN 110 and one or more SNs 111, 112 for communication.

The frequency may comprise any one out of a carrier frequency, a frequency band and a part of a frequency band.

The method described above will now be further explained and exemplified. It should be noted that the examples and embodiments described below and above may be used in any combination and in any suitable way.

In some embodiments, it is assumed that each node such as e.g. the MN 110 and the SNs 111, 112, configured within a multi-connectivity scenario adopts its own RRC entity where at least one of an RRC information element or an RRC message may be generated in each.

Figure 6:
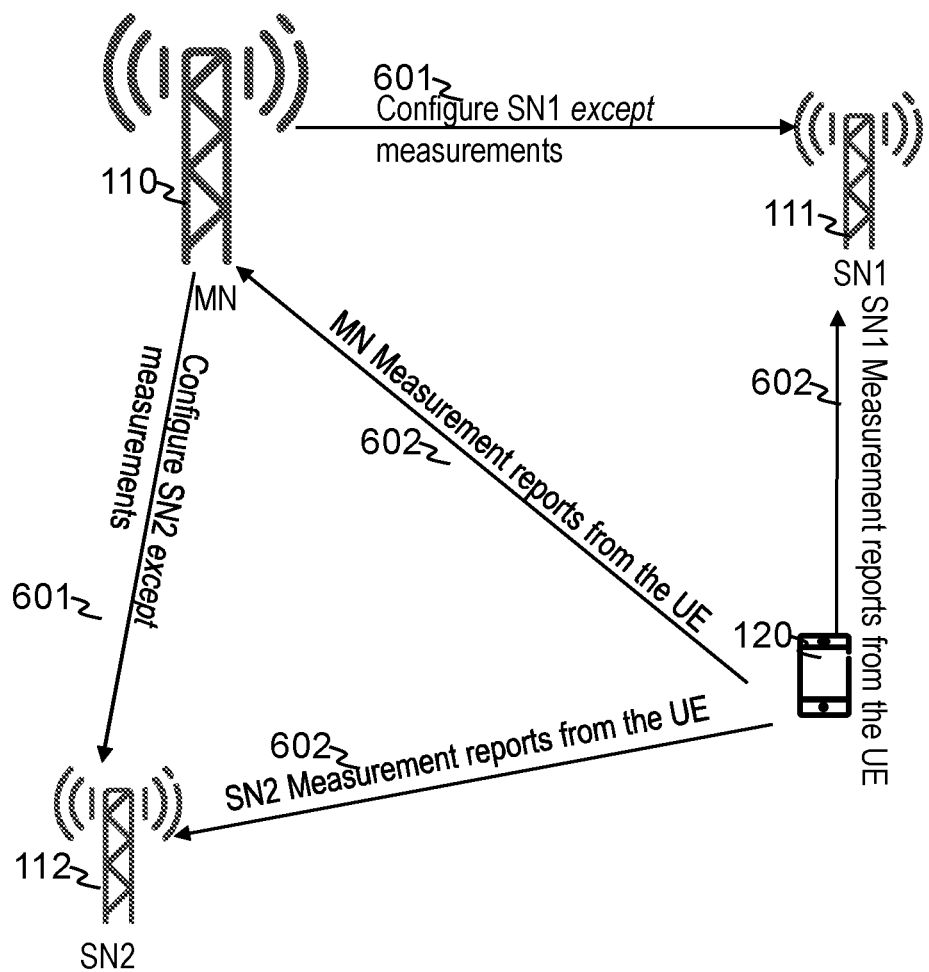
FIG. 6 is a flowchart depicting embodiments of a method in a network node.

In some embodiments which may be referred to as a decentralized configuration, both MN 110 and the SNs111, 112 generates its own measurement configuration for e.g., the SN generates the measurement configuration to the UE 120 for the SN frequencies. This may be referred to as decentralized measurement configuration. An example of this is shown in FIG. 6, wherein the SN 111 is referred to as SN 1 and the SN 112 is referred to as SN2. In this example, the MN 110 configures 601 the SNs 111, 112 except for measurements. Instead each of the SNs 111, 112 and also the MN 110 each configures the UE 120 themselves. The respective MN 110 and the SNs 111, 112 each configures the UE 120 with path and/or destination for the measurement reports such that the UE 120 sends 602 a respective measurement report to the corresponding MN 110 and the SNs 111, 112.

This configuration may be conveyed to the UE 120 via NR RRC IEs. In this case, content-wise the RRC reconfiguration message and specifically the measConfig would look the same regardless of who generated the IEs when both the MN 110 and the SNs 111, 112 are NR. Furthermore, each of the MN 110 and the SNs 111, 112 may include an SRB-Identity (ID) configuration in the measurement configuration IE and/or measurement configuration message, such as e.g., measConfig, by which the UE 120 should send the measurement report.

In some examples, the measurement object(s) with the related measurement event(s), are generated by the respective SN 111, 112 e.g., as a measConfig IE and sent via inter-node RRC messages to the MN 110. In this case, the MN 110 generates the final measurement configuration including MN- and SN-generated measurement configurations. In this embodiment, SRB-ID mapping may be done in measConfig IE or in the measurement event or in measurement object.

MeasConfig IE when used herein means the information element describing the measurement configuration for the UE 120.

Measurement event when used herein means to let the UE 120 know when to send these measurements carried out as measurement report to the network.

Measurement object when used herein means cells or specific frequencies for which specific measurement configuration parameters apply, e.g. specific offsets.

In some further examples, the same measurement object may be mapped with multiple SRB-IDs in the measurement event level, i.e., in a Reporting Configurations To Add and/or Modify (ReportConfigToAddMod) field, if the measurement object is the same for the MN 1110 and the SN 111, 112.

In some other examples, the UE 120 reports the measurement report depending on the SRB-ID information given in the measurement configuration.

There may be more than one measurement configuration IE in the same RRC message: E.g., measConfig and measConfig-2 IEs carrying MN 110 and SN 111, 12 measurement configurations for which the measurement report path may identified by the SRB-ID info included in each IE.

In some examples, SRB-ID info may be an optional field. In this case, if this info is not present, the measurement report is sent to the MN 110.

Figure 7:
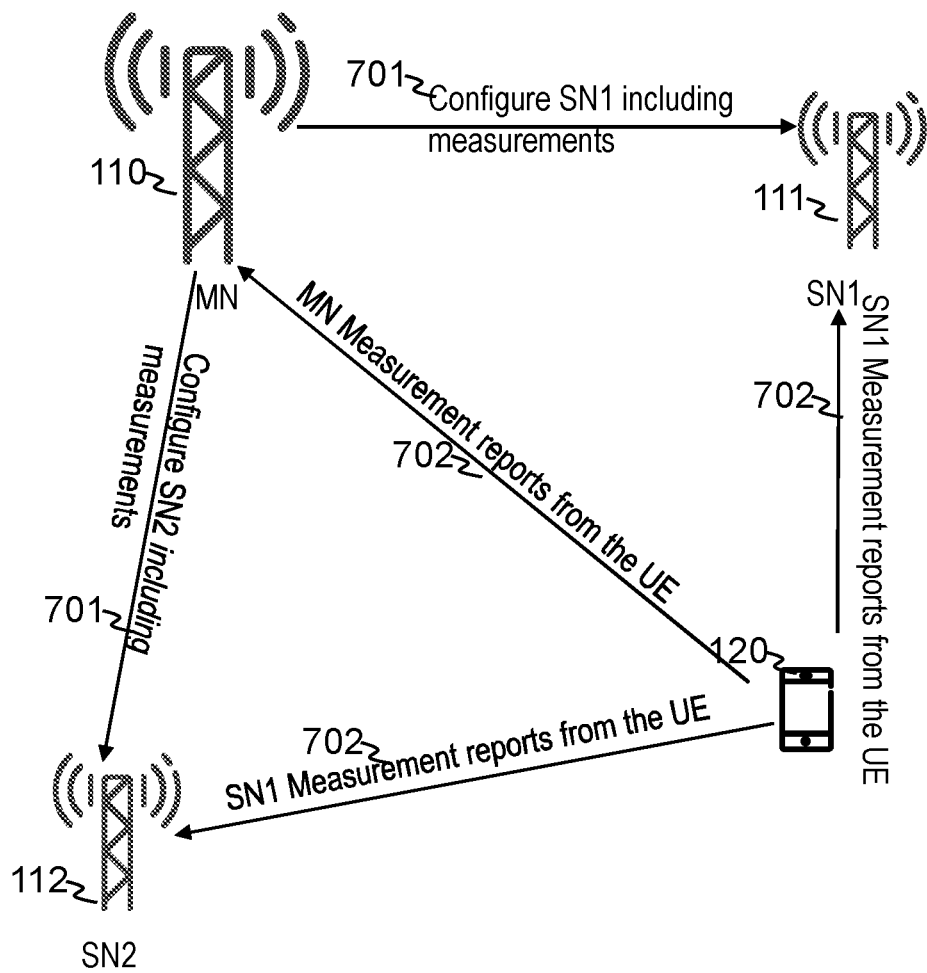
FIG. 7 is a flowchart depicting embodiments of a method in a network node.

In some embodiments which may be referred to as centralized configuration, the MN 110 may configure the UE 120 with path and/destination for the MN 110 and the SNs 111, 112. An example of this is shown in FIG. 7, wherein the SN 111 is referred to as SN 1 and the SN 112 is referred to as SN2. In this example, the MN 110 configures 701 the SNs 111, 112 including measurements. The MN 110 may send all measurement configurations relating to the MN 110 and the respective the SNs 111, 112 configuring the UE 120 with path and/or destination for the measurement reports such that the UE 120 sends 702 a respective measurement report to the corresponding MN 110 and the SNs 111, 112.

The MN 110 thus configures the UE 120 with the measurement report path and/or destination e.g. for each measurement object, i.e. the UE 120 measurement report may be sent to an MN RRC or an SN RRC entity via an MN SRB or SN SRB, respectively. The path and/or destination of each measurement configuration may be marked by adding information and/or an identifier of a higher layer on the SRB and/or target RRC i.e., by means of SRB-ID within the measurement configuration such as MeasConfig IE.

In some examples, an RRC message may also mark a further path and/or destination of each measurement configuration so as to configure whether the measurement report should be forwarded by the receiving network node 120 to any other network node, and thus another RRC entity, than the path and/or destination. E.g., to the MN 110 if the measurement report path and/or destination was the SN 111, 112. This is an advantage since it makes it easier to coordinate measurements and handling mobility management. In some examples, the forwarding node's RRC may adapt the forwarded message to the target node's RRC. In some other examples, the forwarding node's RRC may be embed in the same RRC message or IEs, without changing, in the inter-node RRC or inter-node message over an X2/Xn logical interface between the nodes.

In some examples, the path and/or destination may be identified by an SRB identifier or an RRC entity identifier within the multi-connectivity configuration. In one example, an SRB/RRC identifier, e.g., SRB-ID and/or RRC-ID, is an integer whose value is chosen from a range that varies from 1 to the maximum number of SRBs and/or RRC entities configured within the multi-connectivity configuration. Yet in another example, the SRB and/or RRC identifier may be a sequence of fields that belongs to a given RRC entity e.g., Serving cell index, Logical channel identity, etc. In another example, instead of a specific SRB and/or RRC identifier, the identifier for a host may be used e.g., a Central nit (CU) identifier or a node and/or base station and/or gNB ID.

To be able to assess what configuration the measurement report is coupled with, the configuring node's RRC entity may need to inform the other node's RRC entity that the UE 120 will report to about the measurement configuration. In order to enable this, an inter-node message over RRC or an inter-node message over X2/Xn logical interface between the nodes such as the MN 110 and the SNs 111, 112 may be used. Accordingly, the inter-node RRC message may be embed in the full measurement configuration or the part of the measurement configuration such as measurement ID, measurement triggers to the node(s) such as the MN 110 and the SNs 111, 112 that the UE 120 will report to.

In some of the centralized configuration embodiments, the MN 110 may configure the UE 120 with measurements and gaps for the MN 110 and the SNs 111, 112.

RRC Message Implementation

Figure 8:
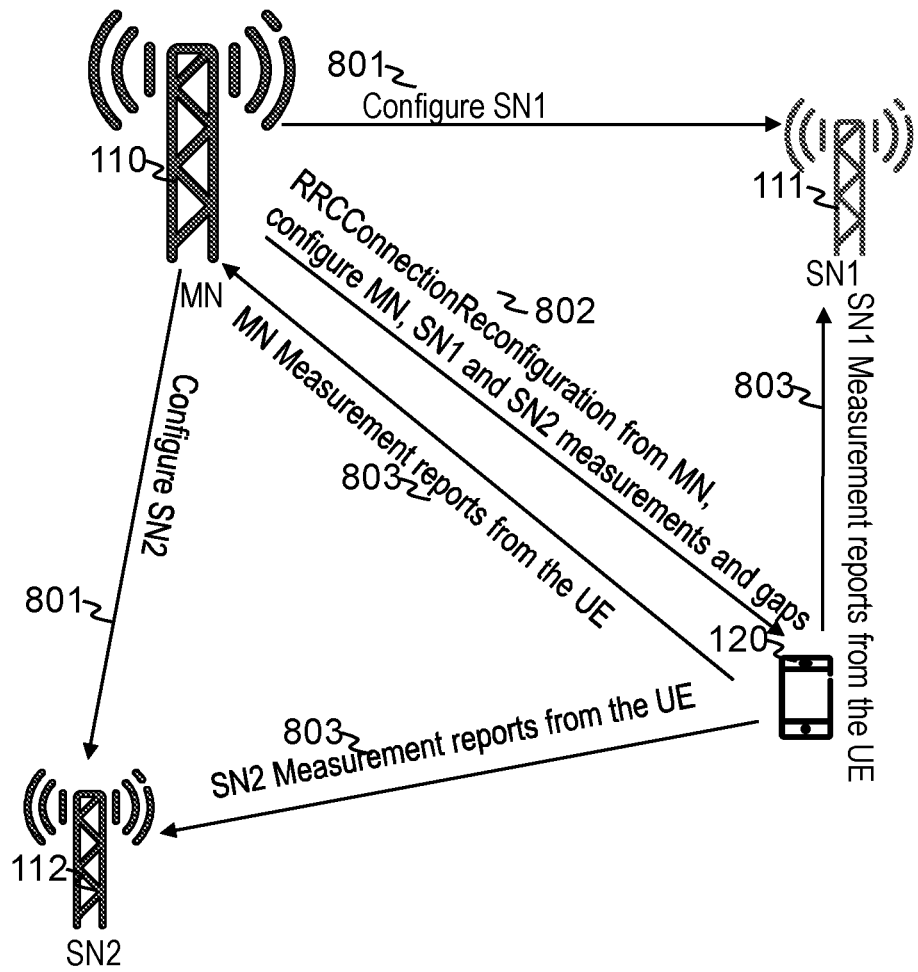
FIG. 8 is a schematic block diagram illustrating embodiments of a wireless communications network.

The measurements configuration may be generated by the MN 110 or any of the SNs 111, 112, eNB and/or gNB via the RRC reconfiguration (RRCReconfiguration) message. An example of this is shown in FIG. 8, wherein the SN 111 is referred to as SN 1 and the SN 112 is referred to as SN2. In this example, the MN 110 configures 801 the SNs 111, 112 including measurements. The MN 110 then configures 802 the UE 120 with all measurement configurations relating to the MN 110 and the respective the SNs 111, 112 by configuring the UE 120 with path and/or destination for the measurement reports such that the UE 120 sends 803 a respective measurement report to the corresponding MN 110 and the SNs 111, 112.

In this case the UE 120 may be configured with the measConfig IE to perform intra and/or inter-frequency measurements and to which cell and/or network node 110, 111, these should be reported. However, in the current LTE and NR specification, the measurements report is sent to the network node that has configured the UE. For this reason, an SRB identity (SRB-ID) or similar identifier should be added to the measConfig IE in order to enable the reporting to a different network node.

Below an implementation example in the RRC specification is provided on how to implement what has been described above regarding SRB-ID.

The example concerns a case where the SRB-ID is included in the MeasConfig IE that may be generated by the MN such as the MN 110 and SN such as any of the SNs 111, 112 and is used to specify measurements to be performed by the UE such as the UE 120. In this example, the SRB-ID field according to embodiments herein is underlined and is named as srbToReport.

MeasConfig information element:

```
-- ASN1START
-- TAG-MEAS-CONFIG-START
MeasConfig ::=                   SEQUENCE {
    measObjectToRemoveList          MeasObjectToRemoveList          OPTIONAL,-- Need N
    measObjectToAddModList          MeasObjectToAddModList          OPTIONAL,-- Need N
    reportConfigToRemoveList        ReportConfigToRemoveList        OPTIONAL,-- Need N
    reportConfigToAddModList        ReportConfigToAddModList        OPTIONAL,-- Need N
    measIdToRemoveList              MeasIdToRemoveList              OPTIONAL,-- Need N
    measIdToAddModList              MeasIdToAddModList              OPTIONAL,-- Need N
    s-MeasureConfig                 CHOICE {
        ssb-RSRP                        RSRP-Range,
        csi-RSRP                        RSRP-Range
    }                                                               OPTIONAL,-- Need M
    quantityConfig                  QuantityConfig                  OPTIONAL,-- Need M
    measGapConfig                   MeasGapConfig                   OPTIONAL,-- Need M
    measGapSharingConfig            MeasGapSharingConfig            OPTIONAL,-- Need M
    ...
    [[
    srbToReport                     SEQUENCE (SIZE (1..3)) OF SRB-Identity OPTIONAL,-- Need M
    ]]
}
MeasObjectToRemoveList ::=       SEQUENCE (SIZE (1..maxNrofObjectId)) OF MeasObjectId
MeasIdToRemoveList ::=           SEQUENCE (SIZE (1..maxNrofMeasId)) OF MeasId
ReportConfigToRemoveList ::=     SEQUENCE (SIZE (1..maxReportConfigId)) OF ReportConfigId
-- TAG-MEAS-CONFIG-STOP
-- ASN1STOP
```

MeasConfig field descriptions measGapConfig
Used to setup and release measurement gaps in NR.
measIdToAddModList
List of measurement identities to add and/or modify.
measIdToRemoveList
List of measurement identities to remove.
measObjectToAddModList
List of measurement objects to add and/or modify.
measObjectToRemoveList
List of measurement objects to remove.
reportConfigToAddModList
List of measurement reporting configurations to add and/or modify
reportConfigToRemoveList
List of measurement reporting configurations to remove.
s-MeasureConfig
Threshold for NR SpCell RSRP measurement controlling when the UE is required to perform measurements
on non-serving cells. Choice of ssb-RSRP corresponds to cell RSRP based on SS/PBCH block and choice of
csi-RSRP corresponds to cell RSRP of CSI-RS. The UE is only required to perform measurements on non-
serving cells when the SpCell RSRP is below that threshold.
MeasGapSharingConfig
The IE MeasGapSharingConfig specifies the measurement gap sharing scheme
srbToReDort
The list of SRB-IDs over which the measurements report has to be sent.

Figure 9:
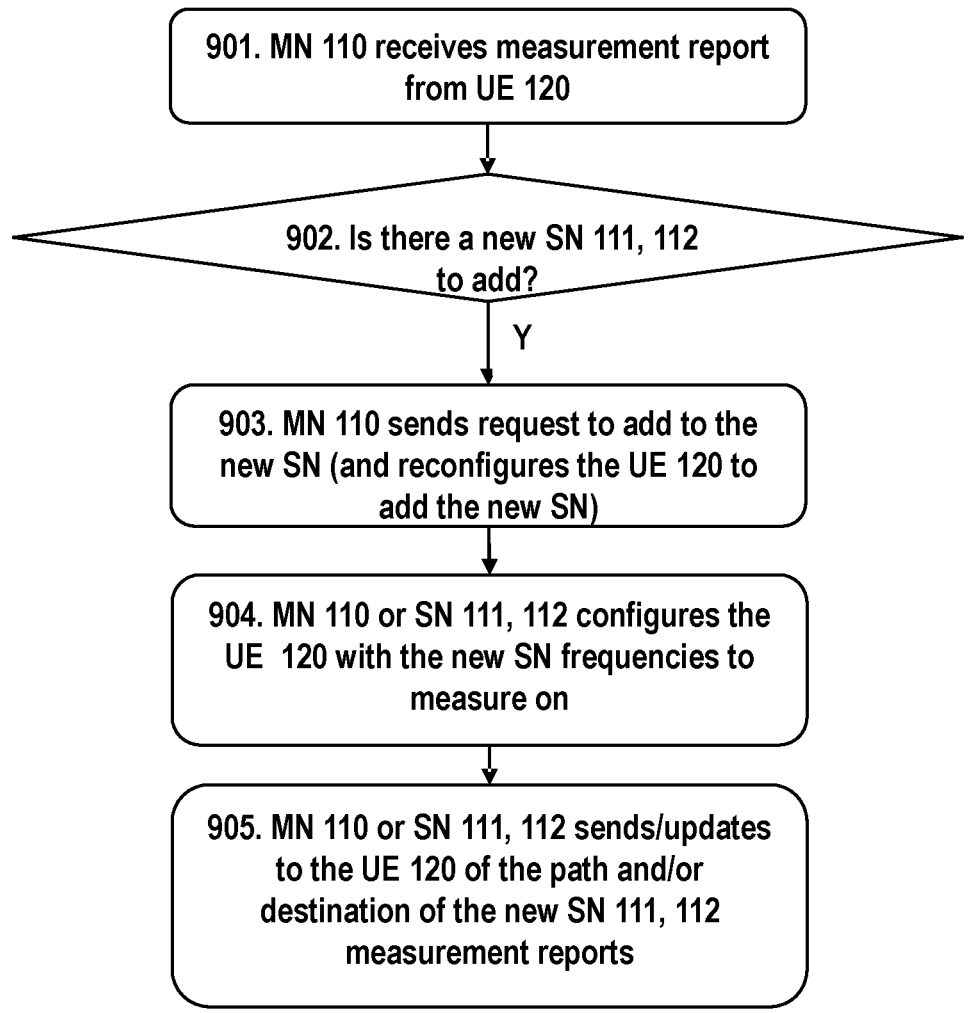
FIG. 9 is a schematic block diagram illustrating embodiments of a wireless communications network.

FIG. 9 shows a flowchart of a simple example of the method in the network node 110, 111, 112 according to embodiments herein. The MN 110 receives 901 a measurement report from UE 120 and decides whether 902 there is a new SN 111, 112 to add. When there is a new SN 111, 112 to add, the MN 110 sends 903 a request to add to the new SN 111, 112 and may reconfigure the UE 120 to add the new SN. The MN 110 or SN 111, 112 configures 904 the UE 120 with the new SN frequencies to measure on. The MN 110 or SN 111, 112 may send to and/or update 905 the UE 120 of the path and/or destination of the new SN 111, 112 measurement reports.

Figure 10:
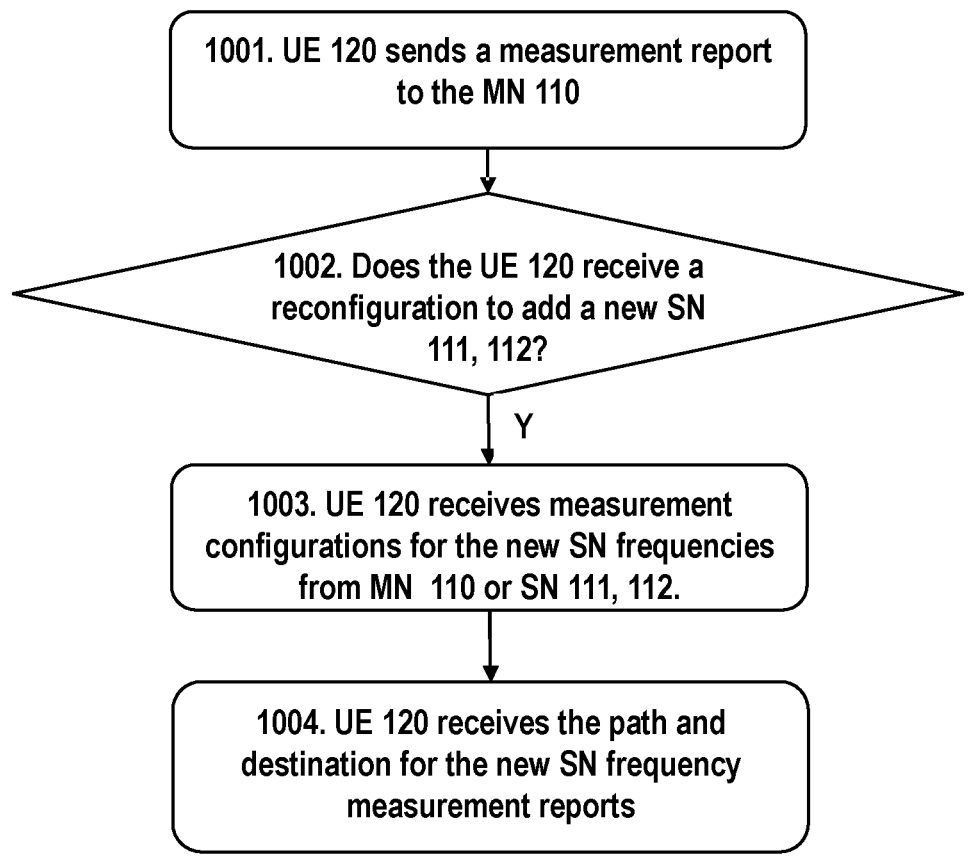
FIG. 10 is a schematic block diagram illustrating embodiments of a wireless communications network.

FIG. 10 shows a flowchart of a simple example of the method in the UE 120 according to embodiments herein. UE 120 sends 1001. a measurement report to the MN 110. The UE 120 establishes 1002 whether it has received a reconfiguration to add a new SN 111, 112. When the UE 120 has received a reconfiguration to add a new SN 111, 112, the UE 120 receives 1003 a measurement configurations for the new SN frequencies from MN 110 or SN 111, 112. The UE 120 then receives 1004 the path and/or destination for the new SN frequency measurement reports.

Figure 11A:
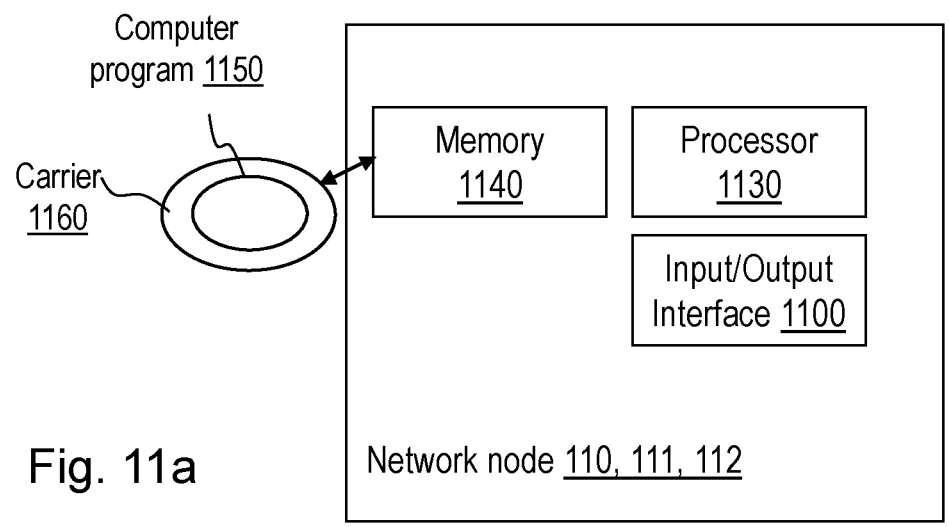
FIG. 11 is a schematic block diagram illustrating embodiments of a network node.
Figure 11B:
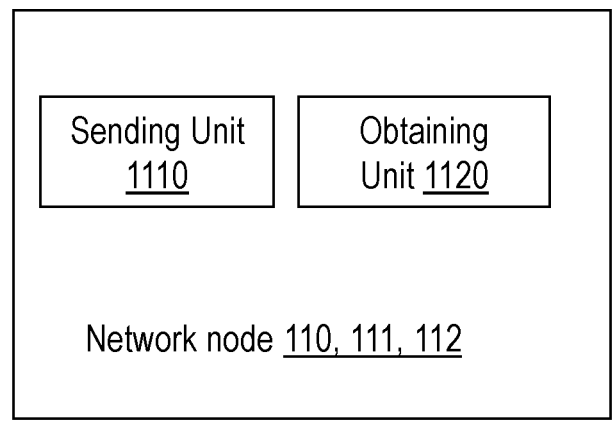

To perform the method actions for handling measurements in a multi connectivity communication between the UE 120 and multiple nodes, the network node 110, 111, 112, may comprise an arrangement depicted in FIGS. 11a and 11b. As mentioned above, the multiple nodes are adapted to comprise the MN 110 and the one or more SNs 111, operable in the wireless communication network 100. The network node 111, 112 is adapted to be any one out of the MN 110 and the SN 111, 112.

The network node 110, 111, 112 may comprise an Input and output Interface configured to communicate with UEs such as the UE 120. The input and output interface may comprise a wireless receiver (not shown) and a wireless transmitter (not shown).

The network node 110, 111, 112 is configured to, e.g. by means of a sending unit in the network node 112, send at least one configuration to the UE 120. The at least one configuration is adapted to comprise any one or more out of: a path and a destination for sending a report from the UE 120 to at least one out of the MN 110 and the one or more SNs 111, 112, The report is adapted to comprise a result of a measurement according to a measurement configuration, configuring the UE 120 to measure a respective frequency provided by at least one out of: the MN 110 and the one or more SNs 111, 112 for communication.

According to some embodiments, the network node 111, 112 is adapted to be the MN 110, and the network node 110, 111, 112 may further be configured to e.g. by means of the sending unit 1110 in the network node 112, send at least one configuration to the UE 120 by sending to the UE 120 the respective configuration for each one out of the MN and the one or more SNs 111, 112. In these embodiments, each respective configuration may be adapted to comprise any one or more out of: the path and the destination for sending a respective report from the UE 120 to each one of the MN 110 and the one or more SNs 111, 112. The respective report is adapted to comprise a result of a respective measurement according to the measurement configuration, configuring the UE 120 to measure a respective frequency provided by each respective MN 110 and one or more SNs 111, 112 for communication.

The network node 110, 111, 112 may further being configured to e.g. by means of a obtaining unit 1120 in the network node 112, obtain a respective configuration from each of the MN 110 and one or more SNs 111, 112. Each configuration may be adapted to comprise any one or more out of: the path and the destination, for sending a respective report from the UE 120 to each one of the MN 110 and the one or more SNs 111, 112. The respective report is adapted to comprise a result of a respective measurement according to the measurement configuration, configuring the UE 120 to measure a respective frequency provided by each respective MN 110 and one or more SNs 111, 112 for communication. In these embodiments, the network node 110, 111, 112 further is configured to send e.g. by means of the sending unit 1110 in the network node 112, at least one configuration to the UE 120 by sending to the UE 120 the respective obtained configuration for each one out of the MN 110 and the one or more SNs 111, 112.

The respective destination may be adapted to comprise any one or more out of: An identifier for an RRC entity, an identifier for a network node, and an identifier for a central or distributed unit.

The respective path may be adapted to comprise any one or more out of: An identifier for an SRB, an identifier for a MCG path of the SRB if it is a Split SRB, and an identifier for SCG path of the SRB if it is a Split SRB.

The at least one configuration may further be adapted to comprise any one or more out of: The measurement configuration, and a measurement event configuration, configuring the UE 120 when to send the respective report comprising the result of the measurement, to the at least one out of: the MN 110 and the one or more SNs 111, 112.

The at least one configuration may be adapted to be sent to the UE 120 in an RRC message.

The frequency may be adapted to comprise any one out of: a carrier frequency, a frequency band and a part of a frequency band.

The embodiments herein may be implemented through a respective processor or one or more processors, such as the processor 1130 of a processing circuitry in the network node 110, 111, 112 depicted in FIG. 11a, together with respective computer program code for performing the functions and actions of the embodiments herein. The program code mentioned above may also be provided as a computer program product, for instance in the form of a data carrier carrying computer program code for performing the embodiments herein when being loaded into the network node 110, 111, 112. One such carrier may be in the form of a CD ROM disc. It is however feasible with other data carriers such as a memory stick. The computer program code may furthermore be provided as pure program code on a server and downloaded to the network node 110, 111, 112.

The network node 110, 111, 112 may further comprise a memory 1140 comprising one or more memory units. The memory 1140 comprises instructions executable by the processor in network node 110, 111, 112. The memory 1140 is arranged to be used to store e.g. data, configurations, and applications to perform the methods herein when being executed in the network node 110, 111, 112.

In some embodiments, a respective computer program 1150 comprises instructions, which when executed by the respective at least one processor 1130, cause the at least one processor of the network node 110, 111, 112 to perform the actions above.

In some embodiments, a respective carrier 1160 comprises the respective computer program 1150, wherein the carrier is one of an electronic signal, an optical signal, an electromagnetic signal, a magnetic signal, an electric signal, a radio signal, a microwave signal, or a computer-readable storage medium.

Those skilled in the art will appreciate that the sending unit 1110 and the obtaining unit 1120 in the network node, 110, 111, 112, described above may refer to a combination of analog and digital circuits, and/or one or more processors configured with software and/or firmware, e.g. stored in the network node, 110, 111, 112, that when executed by the respective one or more processors such as the processors described above. One or more of these processors, as well as the other digital hardware, may be included in a single Application-Specific Integrated Circuitry ASIC), or several processors and various digital hardware may be distributed among several separate components, whether individually packaged or assembled into a system-on-a-chip SoC).

Further Extensions and Variations

Figure 12:
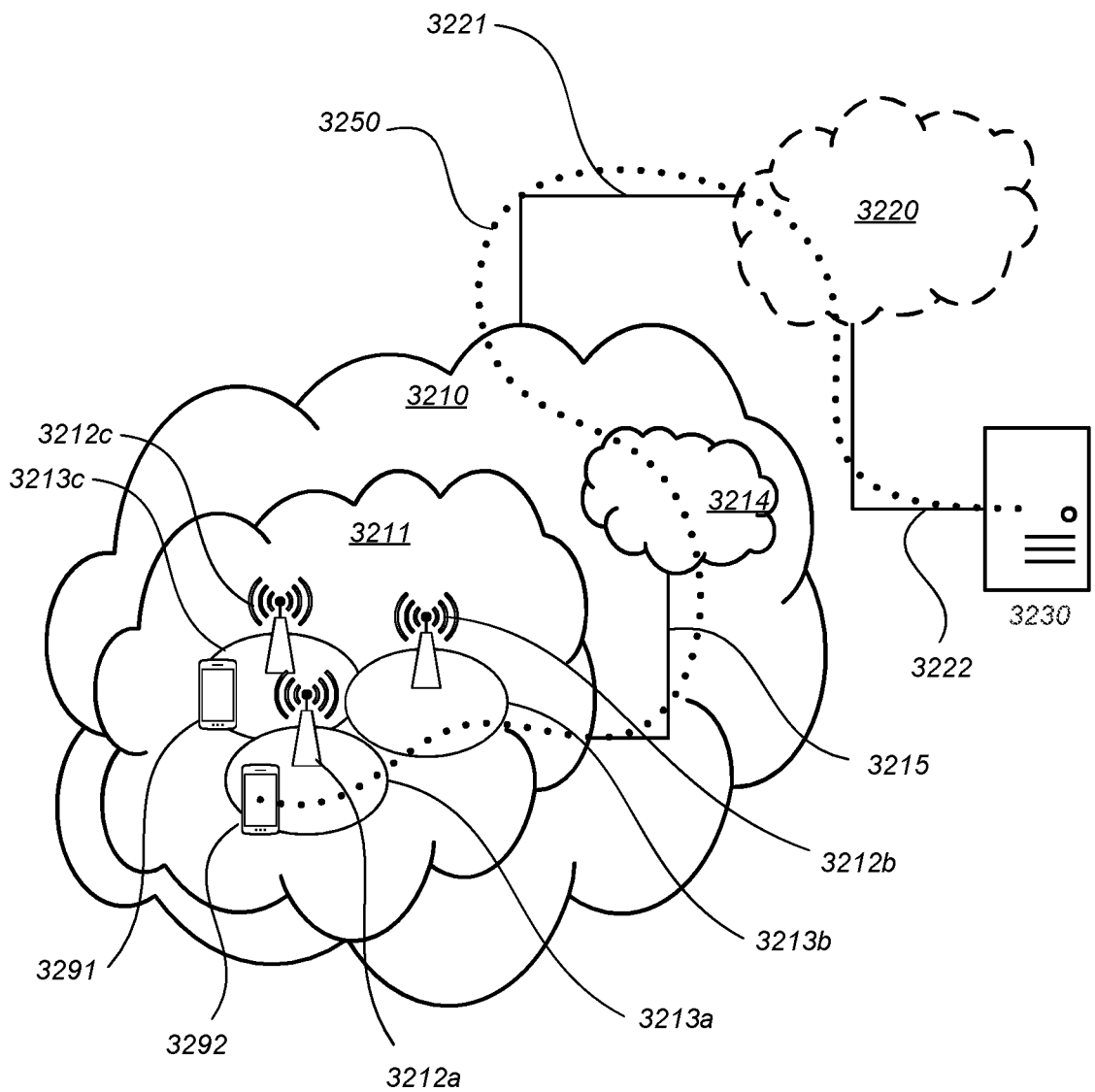
FIG. 12 schematically illustrates a telecommunication network connected via an intermediate network to a host computer.

With reference to FIG. 12, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer or may go via an optional intermediate network 3220. The intermediate network may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE towards the host computer 3230.

Example implementations, in accordance with an embodiment, of the UE, base station and host computer discussed in the preceding paragraphs will now be described with reference to FIG. 13. In a communication system 3300, a host computer comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software includes a host application 3312. The host application 3312 may be operable to provide a service to a remote user, such as a UE 3330 connecting via an OTT connection terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
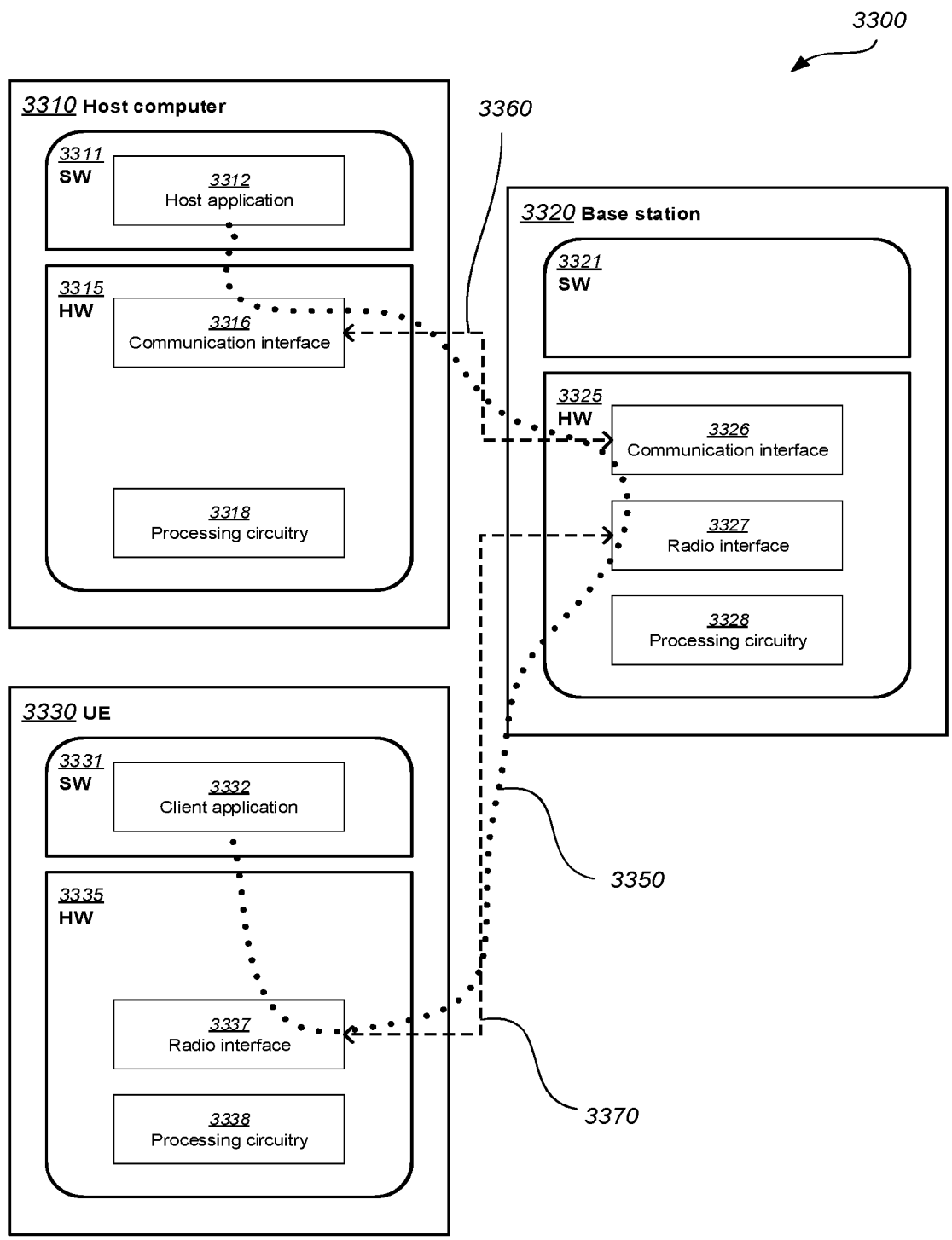
FIG. 13 is a generalized block diagram of a host computer communicating via a base station with a user equipment over a partially wireless connection.
Figures 14, 15:
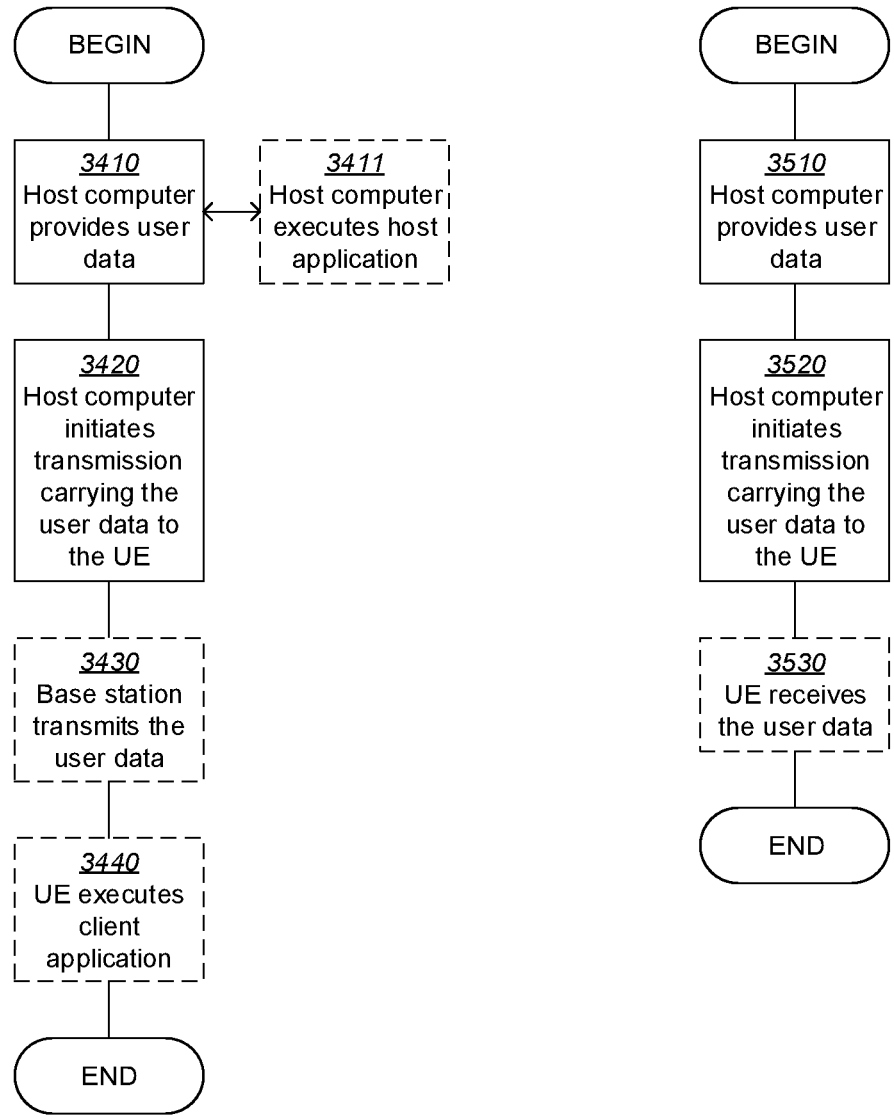

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 14, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station such as the network node 110, and a UE such as the wireless device 120, which may be those described with reference to FIG. 12 and FIG. 13. For simplicity of the present disclosure, only drawing references to FIG. 14 will be included in this section. In a first action 3410 of the method, the host computer provides user data. In an optional sub action 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 15 will be included in this section. In a first action 3510 of the method, the host computer provides user data. In an optional sub action (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 16 will be included in this section. In an optional first action 3610 of the method, the UE receives input data provided by the host computer. Additionally or alternatively, in an optional second action 3620, the UE provides user data. In an optional sub action 3621 of the second action 3620, the UE provides the user data by executing a client application. In a further optional sub action 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub action 3630, transmission of the user data to the host computer. In a fourth action 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 17 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for handling measurements in a multi connectivity communication between a User Equipment, UE, and multiple nodes, the multiple nodes having a Master Node, MN, and one or more Secondary Nodes, SNs, in a wireless communication network, the network node being an MN, the method comprising:

sending at least one configuration to the UE, which at least one configuration comprises:
  any one or more out of: a path and a destination for sending a report from the UE to at least one out of: the MN and the one or more SNs, which report is to comprise a result of a measurement according to a measurement configuration, configuring the UE to measure a respective frequency provided by at least one out of: the MN and the one or more SNs for communication; and
  sending to the UE the respective configuration for each one out of the MN and the one or more SNs, each respective configuration comprising any one or more out of the path and the destination for sending a respective report from the UE to each one of the MN and the one or more SNs, which respective report is to comprise a result of a respective measurement according to the measurement configuration, configuring the UE to measure a respective frequency provided by each respective MN and one or more SNs for communication.

2. The method according to claim 1, further comprising:
obtaining a respective configuration from each of the MN and one or more SNs, wherein each configuration comprises:
  any one or more out of: the path and the destination for sending a respective report from the UE to each one of the MN and the one or more SNs,
  which respective report is to comprise a result of a respective measurement according to the measurement configuration, configuring the UE to measure a respective frequency provided by each respective MN and one or more SNs for communication, and
wherein sending at least one configuration to the UE comprises:
  sending to the UE the respective obtained configuration for each one out of the MN and the one or more SNs.

3. The method according to claim 1, wherein the respective destination comprises any one or more out of:
an identifier for an RRC entity,
an identifier for a network node, and
an identifier for a central or distributed unit.

4. The method according to claim 1, wherein the respective path comprises any one or more out of:
an identifier for a Signaling Radio Bearer, SRB,
an identifier for a Master Cell Group, MCG, path of the SRB, if it is a Split SRB, and
an identifier for Second Cell Group, SCG path of the SRB, if it is a Split SRB.

5. The method according to claim 1, wherein the at least one configuration further comprises any one or more out of:
the measurement configuration, and
a measurement event configuration, configuring the UE when to send the respective report comprising the result of the measurement, to the at least one out of: the MN and the one or more SNs.

6. The method according to claim 1, wherein the at least one configuration is sent to the UE in a Radio Resource Control, RRC, message.

7. The method according to claim 1, wherein the frequency comprises any one out of: a carrier frequency, a frequency band and a part of a frequency band.

8. A non-transitory computer storage medium storing a computer program comprising instructions, which when executed by a processor, cause the processor to perform a method for a network node for handling measurements in a multi connectivity communication between a User Equipment, UE, and multiple nodes, the multiple nodes having a Master Node, MN, and one or more Secondary Nodes, SNs, in a wireless communication network, the network node being an MN, the method comprising:
sending at least one configuration to the UE, which at least one configuration comprises:
  any one or more out of: a path and a destination for sending a report from the UE to at least one out of: the MN and the one or more SNs, which report is to comprise a result of a measurement according to a measurement configuration, configuring the UE to measure a respective frequency provided by at least one out of: the MN and the one or more SNs for communication; and
  sending to the UE the respective configuration for each one out of the MN and the one or more SNs, each respective configuration comprising any one or more out of the path and the destination for sending a respective report from the UE to each one of the MN and the one or more SNs, which respective report is to comprise a result of a respective measurement according to the measurement configuration, configuring the UE to measure a respective frequency provided by each respective MN and one or more SNs for communication.

9. A network node for handling measurements in a multi connectivity communication between a User Equipment, UE, and multiple nodes, the multiple nodes comprising a Master Node, MN, and one or more Secondary Nodes, SNs, in a wireless communication network, the network node being configured to be a MN, the network node further being configured to:
send at least one configuration to the UE, which at least one configuration comprises:
  any one or more out of: a path and a destination for sending a report from the UE to at least one out of: the MN and the one or more SNs, which report is adapted to comprise a result of a measurement according to a measurement configuration, configuring the UE to measure a respective frequency provided by at least one out of: the MN and the one or more SNs for communication; and
send at least one configuration to the UE by sending to the UE the respective configuration for each one out of the MN and the one or more SNs, each respective configuration comprising:
  any one or more out of: the path and the destination for sending a respective report from the UE to each one of the MN and the one or more SNs, which respective report is adapted to comprise a result of a respective measurement according to the measurement configuration, configuring the UE to measure a respective frequency provided by each respective MN and one or more SNs for communication.

10. The network node according to claim 9, further being configured to:
obtain a respective configuration from each of the MN and one or more SNs, wherein each configuration comprises:
  any one or more out of: the path and the destination for sending a respective report from the UE to each one of the MN and the one or more SNs,
  which respective report is adapted to comprise a result of a respective measurement according to the measurement configuration, configuring the UE to measure a respective frequency provided by each respective MN and one or more SNs for communication, and wherein the network node further is configured to send at least one obtained configuration to the UE by sending to the UE the respective configuration for each one out of the MN and the one or more SNs.

11. The network node according to claim 9, wherein the respective destination comprises any one or more out of:
   an identifier for an RRC entity,
   an identifier for a network node, and
   an identifier for a central or distributed unit.

12. The network node according to claim 9, wherein the respective path comprises any one or more out of:
   an identifier for a Signaling Radio Bearer, SRB,
   an identifier for a Master Cell Group, MCG, path of the SRB, if it is a Split SRB, and
   an identifier for Second Cell Group, SCG path of the SRB, if it is a Split SRB.

13. The network node according to claim 9, wherein the at least one configuration further comprises any one or more out of:
   the measurement configuration, and
   a measurement event configuration, configuring the UE when to send the respective report comprising the result of the measurement, to the at least one out of:
   the MN and the one or more SNs.

14. The network node according to claim 9, wherein the at least one configuration is configured to be sent to the UE in a Radio Resource Control, RRC, message.

15. The network node according to claim 9, wherein the frequency comprises any one out of: a carrier frequency, a frequency band and a part of a frequency band.

16. The method according to claim 1, wherein the respective destination comprises any one or more out of:
   an identifier for an RRC entity,
   an identifier for a network node, and
   an identifier for a central or distributed unit.

17. The method according to claim 1, wherein the respective path comprises any one or more out of:
   an identifier for a Signaling Radio Bearer, SRB,
   an identifier for a Master Cell Group, MCG, path of the SRB, if it is a Split SRB, and
   an identifier for Second Cell Group, SCG path of the SRB, if it is a Split SRB.

18. The method according to claim 1, wherein the at least one configuration further comprises any one or more out of:
   the measurement configuration, and
   a measurement event configuration, configuring the UE when to send the respective report comprising the result of the measurement, to the at least one out of: the MN and the one or more SNs.

* * * * *